US009777937B2

United States Patent
Endel et al.

(10) Patent No.: US 9,777,937 B2
(45) Date of Patent: Oct. 3, 2017

(54) CONTROLLER AND LOOP PERFORMANCE MONITORING IN A HEATING, VENTILATING, AND AIR CONDITIONING SYSTEM

(71) Applicant: Honeywell International Inc., Morristown, NJ (US)

(72) Inventors: Petr Endel, Prague (CZ); Rajni Jain, Karnataka (IN); Christopher Chapman, Horsham (GB); Ranganathan Srinivasan, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 818 days.

(21) Appl. No.: 14/258,556

(22) Filed: Apr. 22, 2014

(65) Prior Publication Data
US 2015/0300674 A1 Oct. 22, 2015

(51) Int. Cl.
  G05B 13/02 (2006.01)
  F24F 11/00 (2006.01)
  G05B 23/02 (2006.01)

(52) U.S. Cl.
  CPC ........ *F24F 11/0009* (2013.01); *F24F 11/006* (2013.01); *F24F 11/0086* (2013.01);
  (Continued)

(58) Field of Classification Search
  CPC .. F24F 11/006; F24F 11/0009; F24F 11/0086; F24F 2011/0052; F24F 2011/0091; G05B 23/0248
  (Continued)

(56) References Cited

U.S. PATENT DOCUMENTS 6,095,426 A * 8/2000 Ahmed ................ F24F 11/006
  165/217
2009/0222139 A1* 9/2009 Federspiel ............ F24F 11/006
  700/278

FOREIGN PATENT DOCUMENTS

EP        2045675 A1    4/2009
WO    2007/067644 A2    6/2007
WO    2012/025337 A1    1/2012

OTHER PUBLICATIONS

Seem, John E., "A New Pattern Recognition Adaptive Controller with Application to HVAC Systems", 1996, 14pg.*
(Continued)

*Primary Examiner* — Ryan Coyer
(74) *Attorney, Agent, or Firm* — Brooks, Cameron & Huebsch, PLLC

(57) ABSTRACT

A controller and loop performance monitoring system is coupled to a controller, detects loop performance degradation in time, and diagnoses a cause of the loop performance degradation. If the cause of loop performance degradation is poor controller tuning, a re-tuning mechanism is triggered. If the cause of loop performance degradation is external to the controller (a disturbance acting on the loop, hardware malfunction etc.), an action defined in control strategy is taken, or the user is informed via alarm, user interface, or upper layer software that collects the performance measures. The monitoring itself is designed to be recursive and with low memory demands, so it can be implemented directly in the controller, without need for data transfer and storage. The monitoring is modular, consisting of oscillation detection and diagnosis part, performance indices part, internal logic part, and triggering part, easily extensible by other performance indices or parts (e.g. for overshoot monitoring). The oscillation detection and diagnosis part includes controller output oscillation monitoring, the performance indi- (Continued)

ces part includes predictability index and offset index. The outputs of the controller and loop performance monitoring are overall loop performance together with loop diagnosis information, and overall controller performance together with controller diagnosis. The outputs of the controller and loop performance monitoring are used as parts of controller and loop performance monitoring user interface.

20 Claims, 9 Drawing Sheets

(52) U.S. Cl.
CPC .. *G05B 23/0248* (2013.01); *F24F 2011/0052* (2013.01); *F24F 2011/0091* (2013.01)

(58) Field of Classification Search
USPC .......................................................... 700/31
See application file for complete search history.

(56) References Cited

OTHER PUBLICATIONS

Extended Search Report and Written Opinion from related European Application 15164153.7 dated Oct. 8, 2015, 4 pp.

* cited by examiner

CONTROLLER AND LOOP PERFORMANCE MONITORING IN A HEATING, VENTILATING, AND AIR CONDITIONING SYSTEM

TECHNICAL FIELD

The present disclosure relates to monitoring and adjusting controller and loop performance in a heating, ventilating, and air conditioning system.

BACKGROUND

Common heating, ventilation, and air conditioning (HVAC) control projects are characterized by: 1) little time for manual tuning and maintenance; 2) installers that are not control engineers; 3) a commissioning during one season that leaves loops operating in other seasons; 4) a non-linear plant causing poor control at some operating points; and 5) disturbances that are significant. As a result of the small amount of time for manual tuning and maintenance, and the fact that installers are normally not control engineers, control loops are often not properly tuned. Even if the control loop is properly tuned, the control quality (loop performance) can deteriorate over time due to seasonal changes, plant non-linearity, hardware malfunctions, or disturbances. Consequently, the comfort level of the building is compromised, energy is wasted, and/or actuators prematurely wear out.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

As noted above, poor controller tuning in a building environment can lead to decreased comfort levels in a building, to energy wastage and/or to prematurely worn out actuators. Consequently, there is a need to monitor a control loop after installation to detect any performance deterioration, to determine whether the degraded performance is caused by external factors (disturbances), a hardware malfunction, or poor controller tuning, and to take proper action to eliminate the cause. In an embodiment, corrective action for poor controller tuning can include automatic triggering of a re-tuning mechanism.

Since there are hundreds of control loops in a building, automatic monitoring, diagnosis and corrective action (or suggesting the corrective action, or prioritizing the loops for maintenance) saves time and effort of maintenance engineers. Automatic corrective actions lead to better comfort level, energy savings, and prolonged life of actuators.

Figure 1:
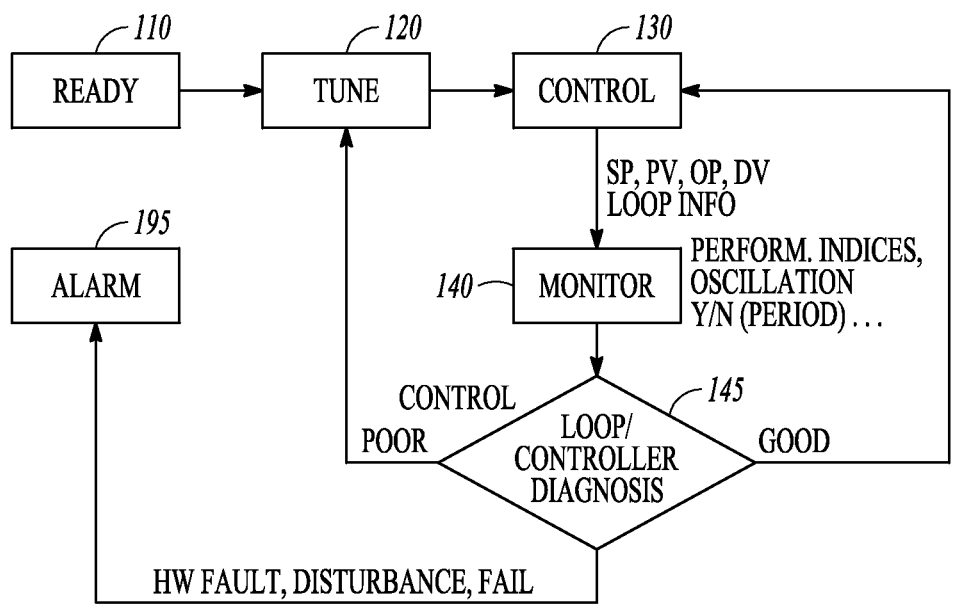
FIG. 1 is block diagram of an embodiment of a detection, diagnosis, and re-tuning system for a heating, ventilating, and air conditioning (HVAC) system.

FIG. 1 illustrates a high level block diagram of a re-tuning module 120 and a controller (control module) 130 that receive an initiation from a ready state 110. A monitor module 140 receives the actual value of a setpoint (SP), a process variable (PV), a controller output (OP), and possibly a disturbance variable (DV) and other loop information. The monitor module 140 evaluates the performance of controller and the performance of the loop as a whole. If the performance of controller and the loop at 145 is satisfactory, the cycle is repeated by control module 130 passing inputs to the monitor module 140. If performance of controller at 145 is not satisfactory (for a significant amount of time), the trigger for re-tuning is passed to tuning module 120 to re-tune the control module 130. If the diagnosis indicates a loop problem that is external to the controller such as a hardware fault, a disturbance acting on the loop, or other failure (for significant amount of time), an alarm 195 is raised.

Figure 4:
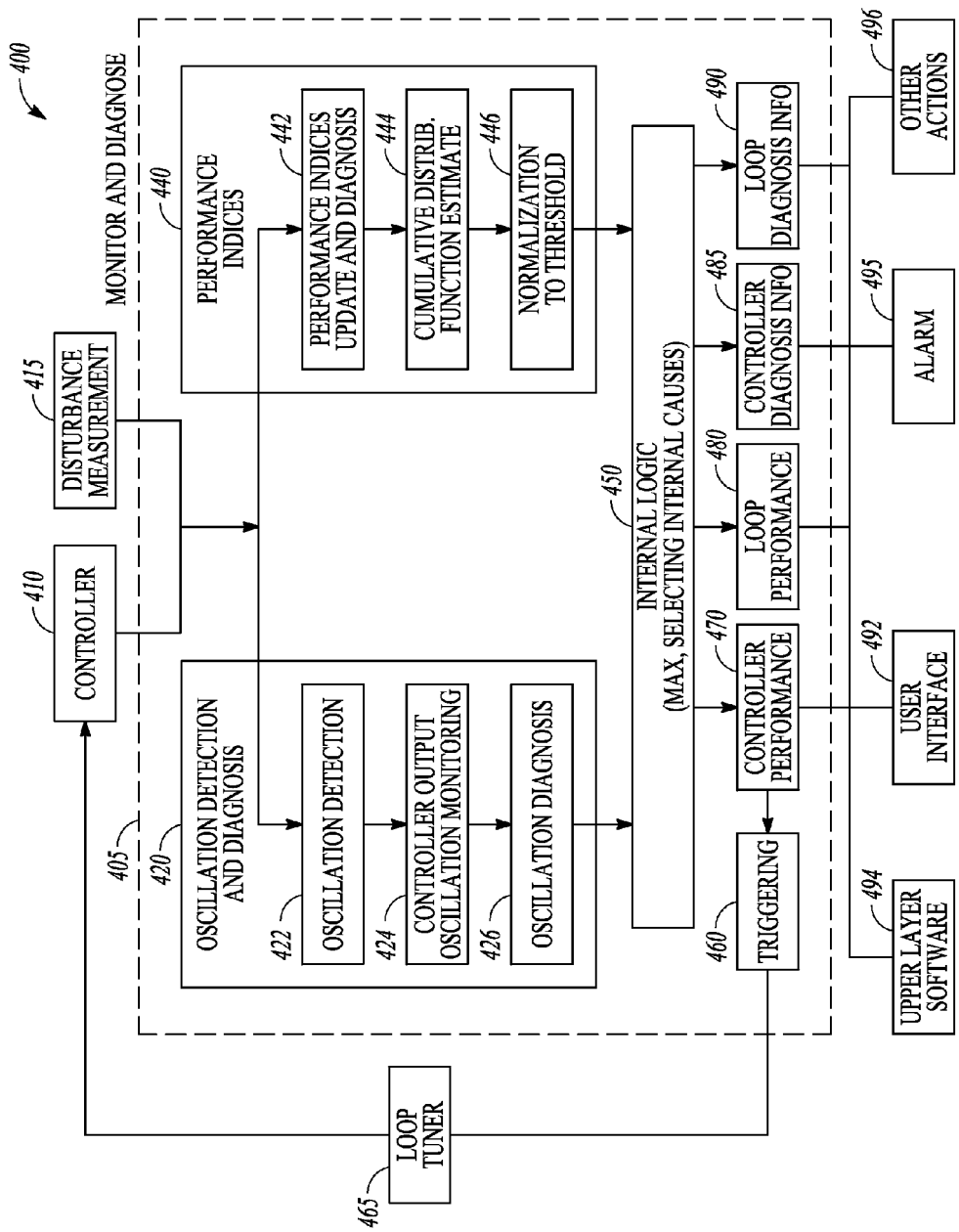
FIG. 4 is a detailed block diagram of controller and loop performance monitoring in a heating, ventilating, and air conditioning (HVAC) system.

A lower level more detailed diagram 400 of the monitoring, detection, diagnosis, and re-tuning is illustrated in FIG. 4. Other examples may reorder the modules, omit one or more module, and/or execute two or more modules in parallel using multiple processors or a single processor organized as two or more virtual machines or sub-processors. Moreover, still other examples can implement the modules as one or more specific interconnected hardware or integrated circuit modules with related control and data signals communicated between and through the modules. Thus, any process flow is applicable to software, firmware, hardware, and hybrid implementations. Controller 410 passes data (the actual value of a setpoint, a process variable, and a controller output) to monitor and diagnose block 405, which possibly receives also a disturbance variable measurement 415. The monitor and diagnose block 405 consists of an oscillation detection and diagnosis module 420, performance indices module 440, internal logic module 450, and triggering module 460. The oscillation detection and diagnosis module 420 consists of oscillation detection module 422, that monitors the presence of oscillation in input signals (process variable, setpoint and disturbance variable, if available), the controller output oscillation monitoring module 424, and the oscillation diagnosis module 426, that determines the cause of oscillations considering the outputs from controller output monitoring sub-module 424. The cause can be external to the controller (a hardware issue, e.g., valve stiction, oscillatory a setpoint, or oscillatory disturbance variable), or internal to controller (poor controller tuning).

The performance indices module 440 consists of performance indices update and diagnosis 442, cumulative distribution function estimate 444 (an update of recursive estimate, or estimate using historical values of performance index), and a normalization to threshold module 446. The performance indices module 440 uses indices to, for example, monitor the offset, predictability of controller error, or fluctuations in controller output, and to provide diagnosis of the causes of poor behavior—that is, external (disturbance, or not properly dimensioned actuator) or internal (poor controller tuning). There may be various other modules implemented as part of monitor and diagnose module 405, for example overshoot monitoring. The outputs from the oscillation detection and diagnosis module 420 and performance indices module 440 (or possibly from other modules) are merged together by internal logic 450. The internal logic module 450 divides the internal causes (caused by the controller) and external causes and for each group selects the maximum from its inputs, so that the overall controller performance 470 and overall loop performance 480 are formed, accompanied by controller diagnosis information 485 stating the cause of the overall controller performance value 470, and by loop diagnosis information 490 stating the cause of the overall loop performance value 480.

The controller performance 470 or the loop performance 480 and the controller diagnosis information 485 or loop diagnosis information 490 may be displayed in a user interface 492 in software connected to the controller to provide a quick reference for service engineers and maintenance personnel. It may also be sent with a selected sampling time to upper layer (supervisory) software 494 for aggregation or prioritization, or may be used to trigger the alarm 495, or to trigger some other action 496 specified in a control strategy definition. Depending on the controller performance 470 trend in time, the triggering module 460 can raise the trigger for retuning to loop tuner 465.

The above-described scheme and logic can be used for loop and controller performance monitoring and re-tuning on the controller level. The process is designed to be recursive (so as to have low overhead), in order to be easily embedded into a controller and performed in real-time.

Performance Indices

There may be various indices implemented as part of the performance indices module 440 in FIG. 4. An embodiment includes two indices—a Predictability Index and an Offset Index.

Predictability Index

The main idea of the control assessment using a Predictability Index is that the controller error (the difference between setpoint and process variable) in the ideal case should be white noise, which means that the controller error should not be predictable. When the controller error is predictable, the prediction could be incorporated into the control in order to improve the control. In prior systems, a ratio of minimum error variance and actual error variance (taken as mean square error) is formed in order to assess the control quality. The minimum error variance is computed as the prediction error variance of a model of controller error (AutoRegressive (AR) or AutoRegressive Moving Average (ARMA) model). The actual error variance computed by mean squared error incorporates the offset of the error.

In contrast, in an embodiment of the present disclosure, the embodiment focuses directly (and only) on the predictability of the controller error, not on the offset part. In situations when the controller output is not saturated, the model of the controller error (AR or ARMA model) is formed and its "quality" (measured by prediction error variance) is compared to two dummy models and their prediction error variances. The first dummy model is the naïve predictor, and the second dummy model takes the mean as the prediction (so that its prediction error variance is in fact the controller error variance). From those two dummy models, the one with lower prediction error variance is selected for comparison. Thus the ratio is formed as prediction error variance of the model of controller error divided by the minimum of naïve predictor error variance and controller error variance. The ratio is subtracted from 1, so that poor control has a Predictability Index close to one. In another embodiment, the system can be set up so that poor control has a Predictability Index close to zero. This embodiment detects regular patterns in controller error, that is, ramps and oscillations. It intentionally does not include offset, so as to be able to distinguish those poor control scenarios. The actual value of the predictability index can be caused by the poor tuning of the controller (internal cause), or by a disturbance (external cause). In order to distinguish these two cases, a model of the disturbance is constructed simultaneously with a model of the controller error, and the predictability of the controller error is compared to the predictability of the disturbance. If the predictability of the controller error is higher than the predictability of the disturbance, then the cause is considered to be internal. Otherwise, the cause is considered to be external.

Figure 6A:
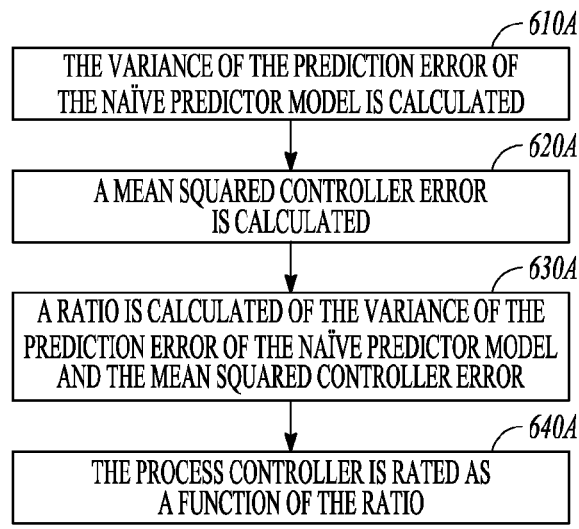
FIG. 6A is a flowchart of example operations and features of generating an offset index.
Figure 6:
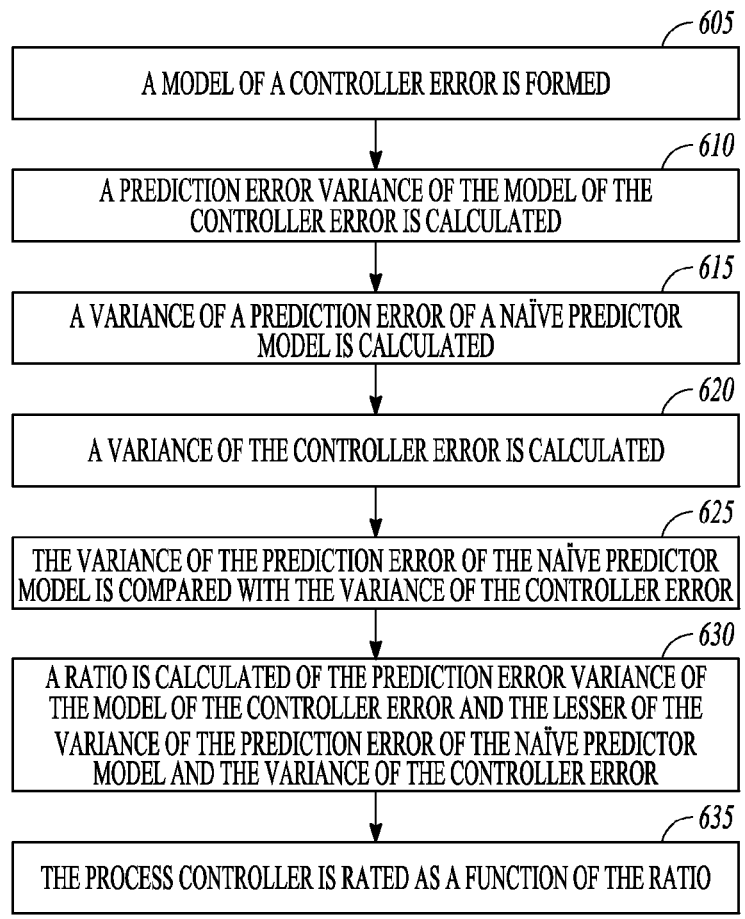
FIG. 6 is a flowchart of example operations and features of generating a predictability index.

FIG. 6 is a flowchart of example operations and features of generating a Predictability Index, and FIG. 6A is a flowchart of example operations and features of generating an Offset Index. FIGS. 6 and 6A include a number of process blocks 605-635 and 610A-640A respectively. Though arranged serially in the examples of FIGS. 6 and 6A, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 6, at 605, a model of a controller error is formed. At 610, a prediction error variance of the model of the controller error is calculated. At 615, a variance of a prediction error of a naïve predictor model is calculated. At 620, a variance of the controller error is calculated. At 625, the variance of the prediction error of the naïve predictor model is compared with the variance of the controller error. At 630, a ratio is calculated of the prediction error variance of the model of the controller error and the lesser of the variance of the prediction error of the naïve predictor model and the variance of the controller error. At 635, the process controller is rated as a function of the ratio.

Figure 7:
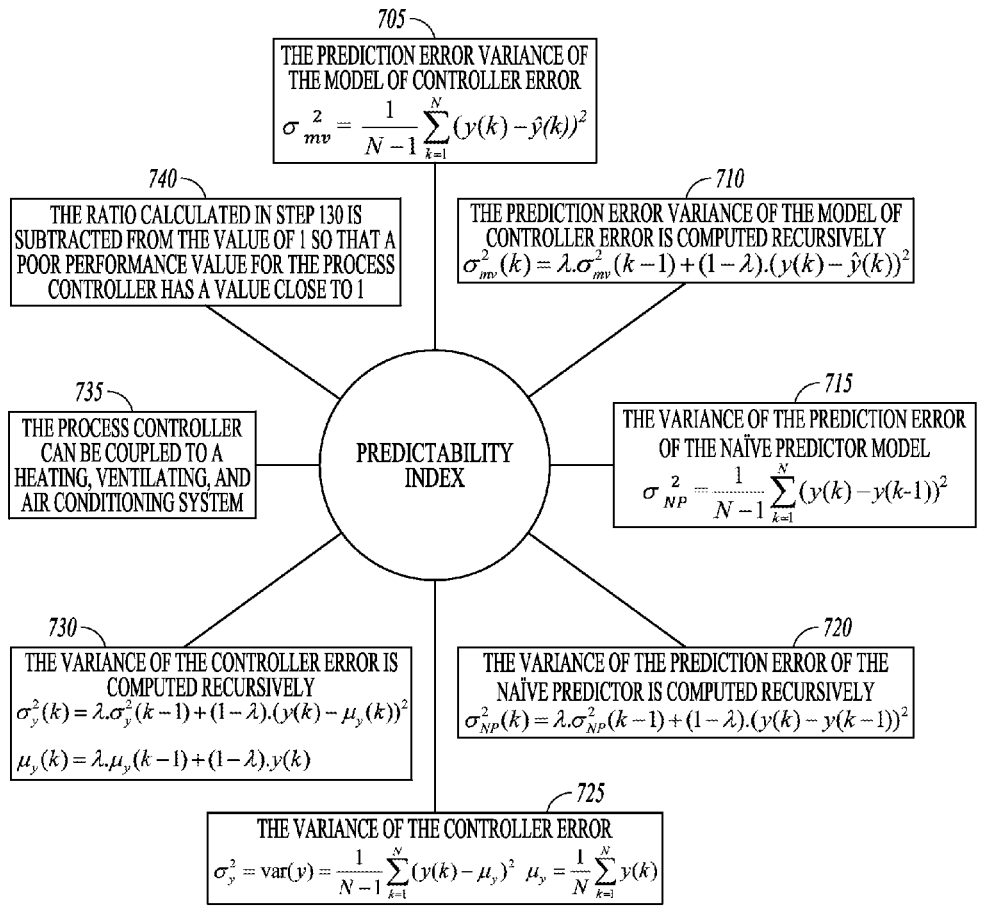
FIG. 7 is a block diagram illustrating additional details and features of generating a predictability index.

FIG. 7 is a block diagram illustrating additional details and features of the Predictability Index embodiment. Block 705 illustrates that the prediction error variance of the model of controller error can be represented as follows:

$$\sigma_{mv}^2 = \frac{1}{N-1}\sum_{k=1}^{N}(y(k)-\hat{y}(k))^2 \qquad \text{Equation No. 1}$$

In Equation No. 1, N is a number of process variable samples, y(k) is a controller error value at sample k (the controller error value is determined by subtracting a process variable from a setpoint), and ŷ(k) is the controller error value predicted by the model of the controller error at sample k.

Block 710 illustrates that the prediction error variance of the model of controller error at sample k can be computed recursively as follows:

$$\sigma_{mv}^2(k)=\lambda\cdot\sigma_{mv}^2(k-1)+(1-\lambda)\cdot(y(k)-\hat{y}(k))^2 \qquad \text{Equation No. 2}$$

In Equation No. 2, $\lambda$ is a forgetting factor of an exponential forgetting, and $\sigma_{mv}^2(k-1)$ is the prediction error variance of the model of controller error at sample k-1.

Block 715 illustrates that the variance of the prediction error of the naïve predictor model can be represented by:

$$\sigma_{NP}^2 = \frac{1}{N-1}\sum_{k=1}^{N}(y(k)-y(k-1))^2 \qquad \text{Equation No. 3}$$

In Equation No. 3, N is a number of process variable samples, y(k) is a controller error value at sample k (the controller error value is determined by subtracting a process variable from a setpoint), and y(k-1) is a controller error value at sample k-1.

Block 720 illustrates that the variance of the prediction error of the naïve predictor model at sample k can be calculated recursively as follows:

$$\sigma_{NP}^2(k)=\lambda\cdot\sigma_{NP}^2(k-1)+(1-\lambda)\cdot(y(k)-y(k-1))^2 \qquad \text{Equation No. 4}$$

In Equation No. 4, $\lambda$ is a forgetting factor of an exponential forgetting, and $\sigma_{NP}^2(k-1)$ is the variance of the prediction error of the naïve predictor model at sample k-1.

Block 725 illustrates that the variance of the controller error can be represented as follows:

$$\sigma_y^2 = \text{var}(y) = \frac{1}{N-1}\sum_{k=1}^{N}(y(k)-\mu_y)^2 \qquad \text{Equation No. 5}$$

In Equation No. 5, N is a number of process variable samples, y(k) is a controller error value at sample k (the controller error value is determined by subtracting a process variable from a set point), and $\mu_y$ is an arithmetic mean value of the controller error, $$\mu_y = \frac{1}{N}\sum_{k=1}^{N}y(k).$$

Block 730 illustrates that the variance of the controller error at sample k can be computed recursively as follows:

$$\sigma_y^2(k)=\lambda\cdot\sigma_y^2(k-1)+(1-\lambda)\cdot(y(k)-\mu_y(k))^2 \qquad \text{Equation No. 6}$$

In Equation No. 6, $\lambda$ is a forgetting factor of an exponential forgetting, $\sigma_y^2(k-1)$ is the variance of the controller error at sample k-1, and $\mu_y(k)$ is an arithmetic mean value at sample k computed recursively as follows:

$$\mu_y(k)=\lambda\cdot\mu_y(k-1)+(1-\lambda)\cdot y(k).$$

Block 740 illustrates that the ratio calculated in step 730 can be subtracted from the value of 1 so that a poor performance value for the process controller has a value close to 1. Block 735 illustrates that the process controller can be coupled to a heating, ventilating, and air conditioning system.

Offset Index

The main purpose of the Offset Index is to detect situations when a process variable is not meeting the setpoint. The Offset Index is defined using a ratio between a naïve predictor error variance and a mean squared controller error. The ratio is then subtracted from 1, so that an undesired situation has a value of the offset index close to one, while a desired situation has a value close to zero. In another embodiment, the system can be set up so that poor control has an Offset Index close to zero. The actual value of the offset index can be caused by the poor tuning of the controller (internal cause), or by a disturbance or by a design issue of an actuator (external causes). In order to distinguish internal from external causes, the controller output value is compared to the 100% saturation value. If the controller output is 100% saturated, the cause is considered to be external, if the controller output is not 100% saturated, the cause is considered to be internal.

FIG. 6A is a flowchart of example operations and features of generating an offset index. At 610A, a variance of a prediction error of the naïve predictor model is calculated. At 620A, a mean squared controller error is calculated. At 630A, a ratio of the variance of the prediction error of the naïve predictor model and the mean squared controller error is calculated. At 640A, the process controller is rated as a function of the calculated ratio.

Figure 7A:
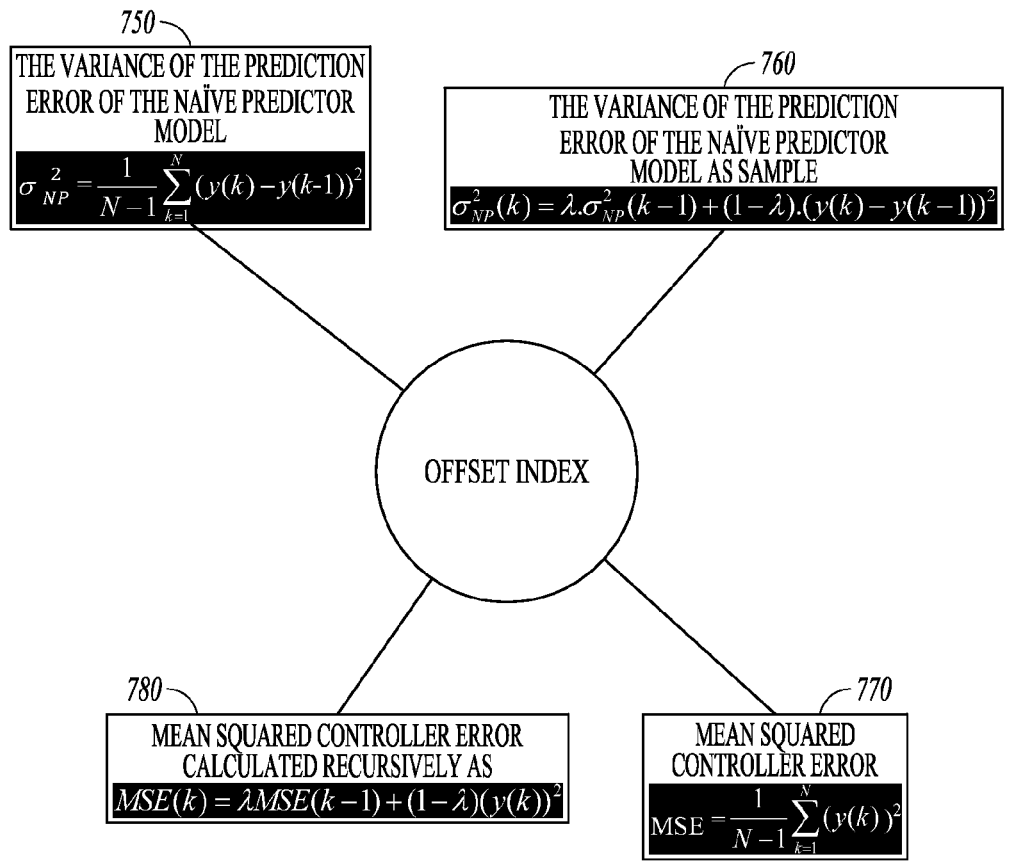
FIG. 7A is a block diagram illustrating features of an offset index.

FIG. 7A is a block diagram illustrating features of an Offset Index. Block 750 illustrates that the variance of the prediction error of the naïve predictor model can be represented by:

$$\sigma_{NP}^2 = \frac{1}{N-1}\sum_{k=1}^{N}(y(k)-y(k-1))^2 \qquad \text{Equation No. 7}$$

In Equation No. 7, N is a number of process variable samples, y(k) is a controller error value at sample k (the controller error value is determined by subtracting a process variable from a setpoint), and y(k-1) is a controller error value at sample k-1. Block 760 illustrates that the variance of the prediction error of the naïve predictor model at sample k can be calculated recursively as follows:

$$\sigma_{NP}^2(k)=\lambda\cdot\sigma_{NP}^2(k-1)+(1-\lambda)\cdot(y(k)-y(k-1))^2 \qquad \text{Equation No. 8}$$

In Equation No. 8, $\lambda$ is a forgetting factor of an exponential forgetting, and $\sigma_{NP}^2(k-1)$ is the variance of the prediction error of the naïve predictor model at sample k-1.

Block 770 illustrates that the mean squared controller error can be represented by:

$$MSE = \frac{1}{N-1}\sum_{k=1}^{N}(y(k))^2 \qquad \text{Equation No. 9}$$

In Equation No. 9, N is a number of process variable samples, y(k) is a controller error value at sample k (the controller error value is determined by subtracting a process variable from a setpoint).

Block 780 illustrates that the mean squared controller error can be calculated recursively as follows:

$$MSE(k)=\lambda MSE(k-1)+(1-\lambda)(y(k))^2 \qquad \text{Equation No. 10}$$

In Equation No. 10, $\lambda$ is a forgetting factor of an exponential forgetting, and MSE(k−1) is the mean squared controller error at sample k−1.

Figure 2:
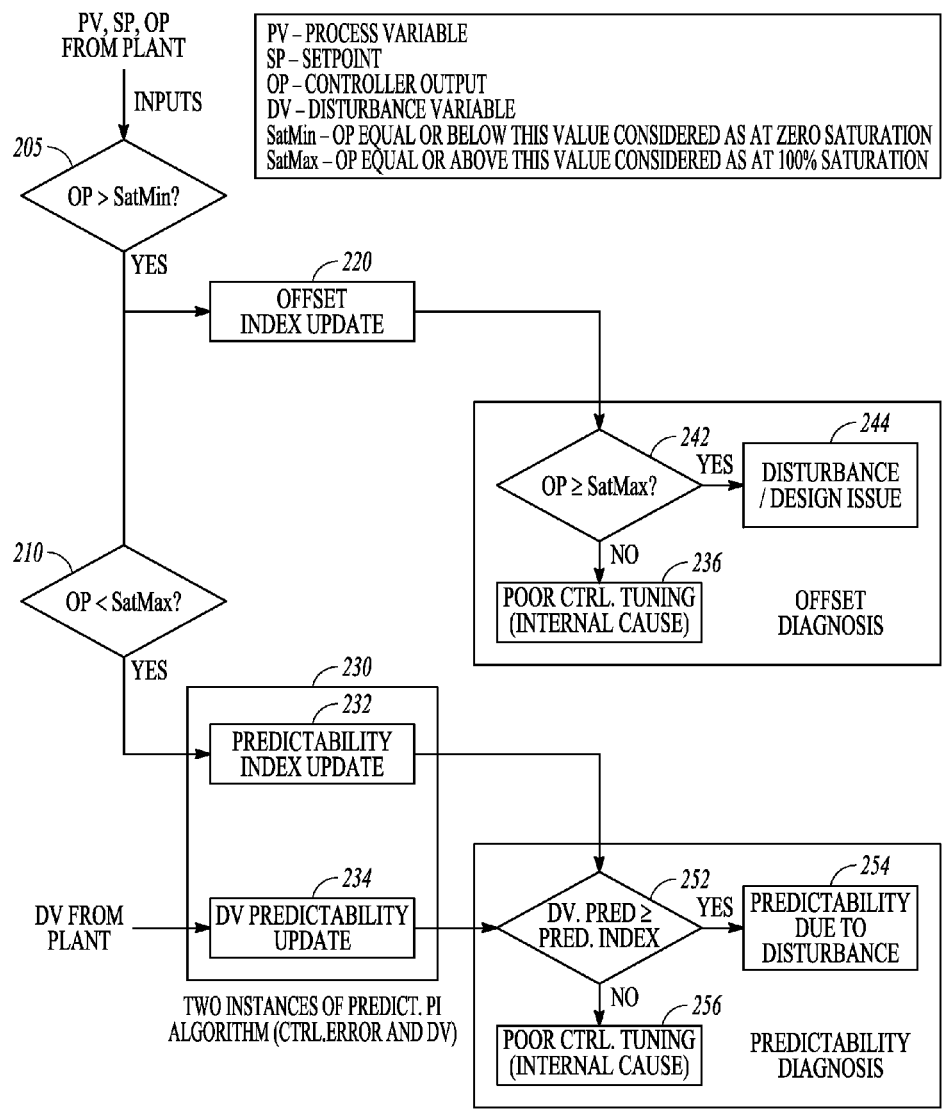
FIG. 2 is a block diagram illustrating an update and diagnosis system for performance indices in an HVAC system.

FIG. 2 further illustrates the performance indices update and diagnosis block 442 from FIG. 4. A process variable, setpoint, and controller output is received from a plant, and at 205, it is determined if the controller output is higher than the value considered as 0% controller output saturation. If the controller output is higher, the value of offset index is updated at 220. Then, if the controller output is equal or higher than the value considered as 100% controller output saturation at 242, the cause of the Offset Index value is considered as external to the controller (disturbance acting on the loop or design issue—e.g. wrongly dimensioned actuator) 244. If the controller output is lower than the value considered as 100% controller output saturation, the cause of the Offset Index value is considered as internal to the controller (i.e., poor controller tuning) 236.

If the controller output is higher than the value considered as 0% controller output saturation 205 and lower than value considered as 100% controller output saturation 210, then the predictability index is updated at 230/232. Simultaneously, the model of disturbance variable and predictability of disturbance variable is updated at 234 using a disturbance variable value. If the predictability of disturbance variable is equal or higher than the predictability index (predictability of controller error) 252, then the cause of the predictability index value is considered to be external (caused by a disturbance) 254. If the the predictability of disturbance variable is lower than the predictability index (predictability of controller error), then the cause of the predictability index value is considered to be internal to the controller (poor controller tuning) 256.

The threshold for an unacceptable value of any index (e.g., the 90th percentile estimate of particular performance index, in a case that poor control has an index value close to one) could be set from historical data, or through an online estimate using quantile regression. Both options are covered by the block cumulative distribution function estimate 444 in FIG. 4. Then the normalization of the actual value of the performance index to the threshold is performed in block 446 of FIG. 4. The normalized value of the index is passed to the internal logic 450.

Controller Output Monitoring

Controller output monitoring 424 in FIG. 4 provides a means to detect and classify oscillations in controller output, which is used by the oscillation detection and diagnosis module 420 to diagnose the cause of oscillations in the input signals. The embodiment allows one to distinguish between bang-bang control (i.e., controller output oscillating between lower and upper bounds, which in turn means poor controller tuning), oscillation touching the lower bound, oscillation touching the upper bound, or oscillation not touching bounds. The monitoring of controller output can prevent wearing out of the actuators and energy wastage, and ensure better comfort of a building.

Prior and current systems use simple measures of controller output (e.g., strokes per day or other heuristic measures, or simple monitoring of controller output reversals), where the threshold for online monitoring of undesired behavior is often hard to set. An embodiment however is based on the time domain, monitoring the distance between the local extremes of controller output signal, and considering the division of local extremes into two groups—minima and maxima. The distance relates to a time interval between local extremes, and also to a distance of amplitudes of local extremes. When a specified number of local extremes of each group lies within a specified neighborhood (those specific values are parameters), then after checking whether minima and maxima are near lower and upper bound respectively, the behavior of oscillations in controller output is inferred.

The local extreme is identified using short-term memory and selecting the minimum or maximum from this memory, when at least one of two conditions is fulfilled: the difference of controller output exceeds some specified limit, or the specified number of controller output differences have the same sign. The neighborhood evaluation of local extremes embodies an acceptable limit between the local extremes distance differences, in both time and amplitude dimensions. The parameter settings take advantage of common range of controller output (from lower bound 0 to upper bound 100%, while this range can be also adjusted), so that the sensitivity on the parameters settings is not high. The output of the controller output monitoring is a classification into the following categories—no oscillation, oscillation touching the upper bound, oscillation touching the lower bound, oscillation without touching the bounds, and bang-bang oscillation touching both bounds. The lower bound is in most applications represented by 0% saturation, the upper bound is in most applications represented by 100% saturation.

The process is designed to be recursive, so as to have low overhead, and in order to be easily embedded into controller and performed in real-time. As stated above, it is meant as part of oscillation detection and diagnosis (420 in FIG. 4), but it can be used separately as well.

Retuning Triggering

Figure 3:
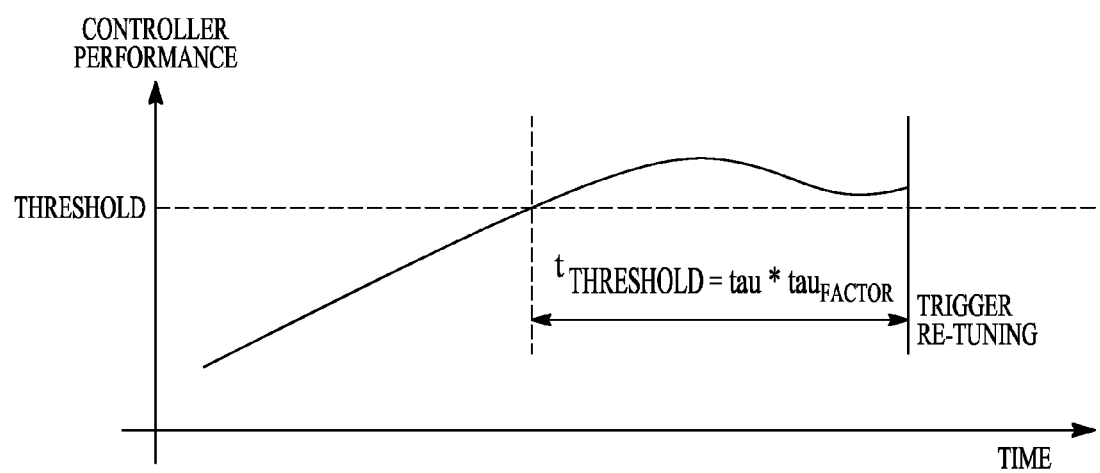
FIG. 3 illustrates a determination of re-tuning triggering for use in controller and loop performance monitoring in an HVAC system.

The re-tuning mechanism is triggered by triggering module 460 in FIG. 4 if the overall controller performance equals or exceeds (for the case that poor performance has an index value higher than good performance) the threshold (i.e. value 1 or 100% if normalization to threshold was performed in module 446 in FIG. 4) for a particular time interval, as depicted in FIG. 3. This time interval is derived as an estimate of process dynamics multiplied by a particular factor. In FIG. 3, tau is an estimate of process dynamics time constant, $tau_{Factor}$ is a multiplicative factor, and the threshold $t_{Threshold}$ is the product of tau and $tau_{Factor}$.

Visualization

Figure 5:
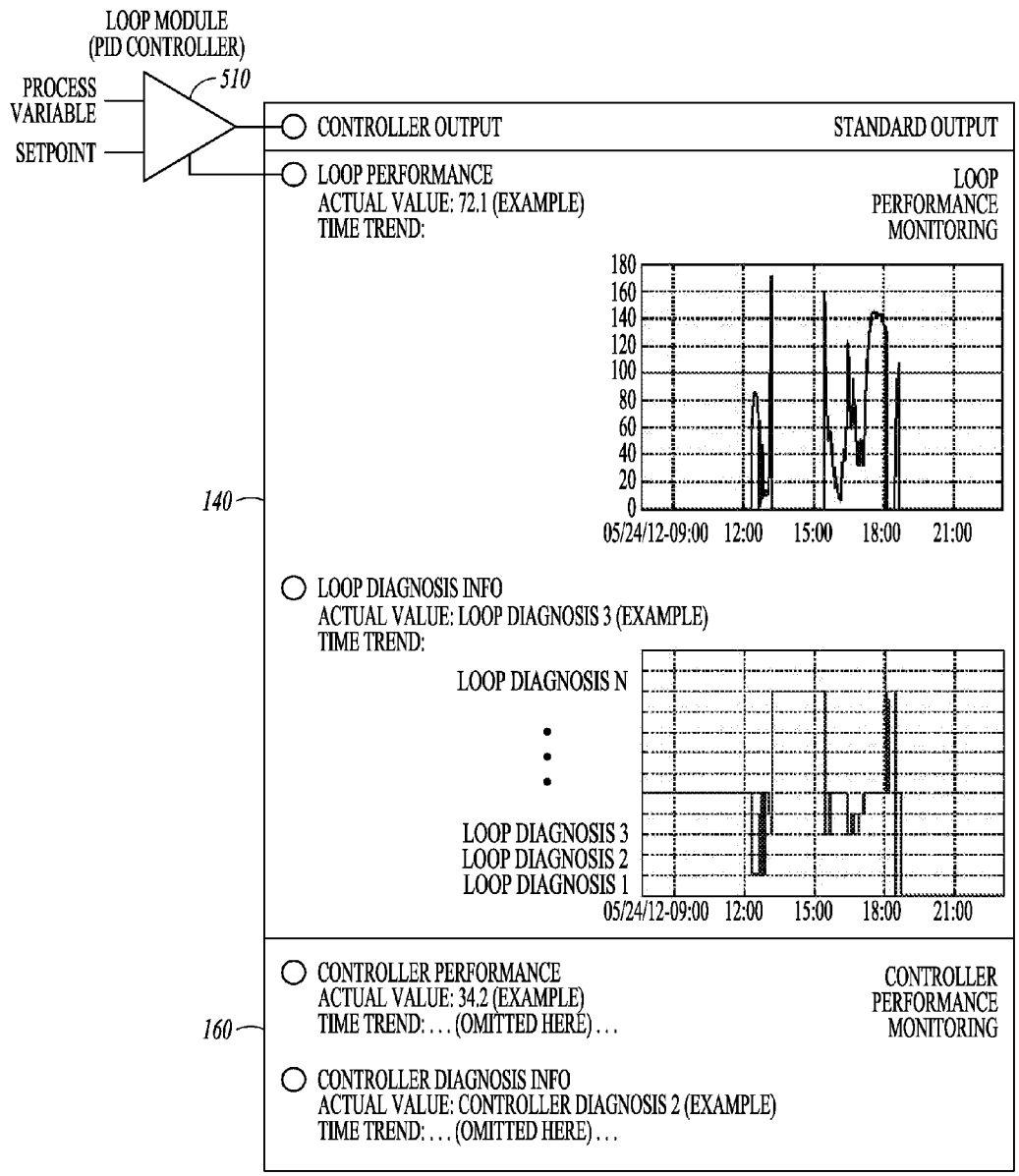
FIG. 5 is a block diagram illustrating a possible controller and loop performance monitoring user interface in an HVAC system.

One of many possible ways to display the monitoring information to the user (FIG. 4; User Interface 492) is illustrated in FIG. 5. An embodiment includes the controller block (part of any software for setting up and maintaining control strategies) 510. The standard output display of FIG. 5 is enhanced by loop performance monitoring display 140 or controller performance monitoring display 160. Loop performance monitoring display 140 shows the actual value and/or time trend of the loop performance together with actual value and/or time trend of loop diagnosis information. Controller performance monitoring display 160 shows the actual value and/or time trend of the controller performance together with actual value and/or time trend of controller diagnosis information. Both loop diagnosis information and controller diagnosis information contain the diagnoses inferred using the performance indices and/or oscillation detection and diagnosis described above, or other diagnoses using other performance indices (e.g., fluctuations in the controller output, overshoot), or other information about the state of the loop (e.g., tuning in progress, control off). The solution enhances the prior art with a deeper diagnosis used in the monitoring part, which triggers the re-tuning algorithm or gives information, an alert, or possibly prioritization to maintenance personnel. The deeper diagnosis maintains simple outputs that are easily comprehensible by the user (that is, loop performance or controller performance measure and the loop diagnosis information or controller diagnosis information).

Figure 8:
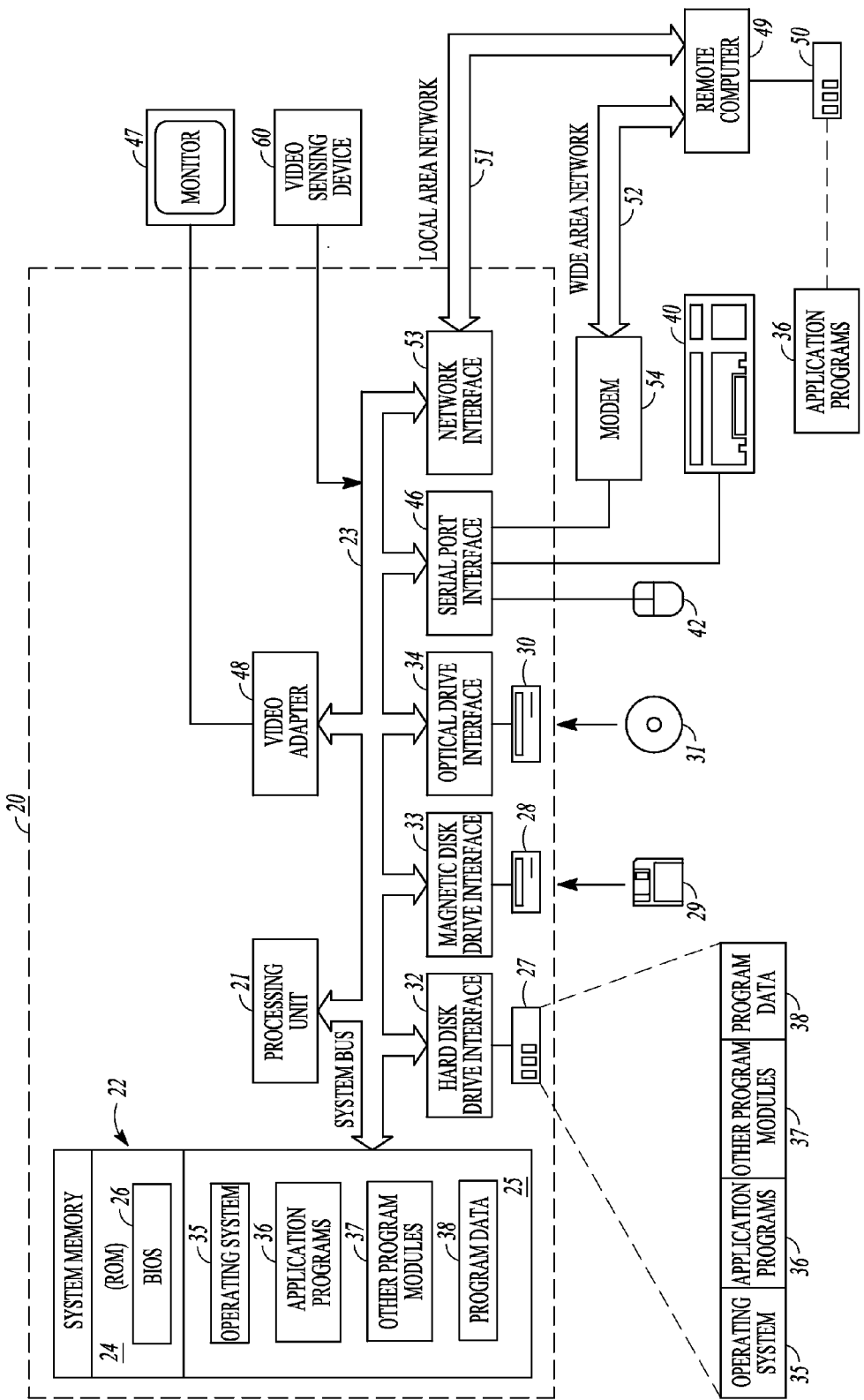
FIG. 8 is an overview diagram of hardware and an operating environment in conjunction with which embodiments of the invention may be practiced.

FIG. 8 is an overview diagram of hardware and an operating environment in conjunction with which embodiments of the invention may be practiced. The description of FIG. 8 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 8, a hardware and operating environment is provided that is applicable to any of the servers and/or remote clients shown in the other Figures.

As shown in FIG. 8, one embodiment of the hardware and operating environment includes a general purpose computing device in the form of a computer 20 (e.g., a personal computer, workstation, controller, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non-volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 8 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A controller and loop performance monitoring system comprising:
    a controller circuit;
    a monitor and diagnose circuit; and
    a retuning circuit;
    wherein the controller circuit is coupled to a controller and is configured to pass data from the controller to the monitor and diagnose circuit;
    wherein the monitor and diagnose circuit comprises an oscillation detection and diagnosis circuit, a performance indices circuit, an internal logic circuit, and a triggering circuit, and wherein the oscillation detection and diagnosis circuit is configured to monitor a presence of an oscillation in signals from the controller circuit, diagnose a cause of the oscillation and determine whether the cause is external to the controller or internal to the controller;
    wherein the internal logic circuit is coupled to the oscillation detection and diagnosis circuit, the performance indices circuit, and a triggering circuit;
    wherein the triggering circuit is coupled to a retuning circuit configured to retune the controller responsive to a determination that the cause is internal to the controller; and
    wherein the monitor and diagnose circuit is coupled to a higher level software or user interface configured to trigger an alarm responsive to a determination that the cause is external to the controller.

2. The controller and loop performance monitoring system of claim 1, wherein data passed from the controller circuit to the monitor and diagnose circuit comprise a setpoint, a process variable, a controller output, and a disturbance variable measurement.

3. The controller and loop performance monitoring system of claim 2,
    wherein the performance index circuit is configured to use one or more indices to monitor a loop and provide a diagnosis of one or more causes of poor loop performance and whether such causes are internal to the controller or external to the controller;
    wherein the internal logic circuit is configured to merge output from the oscillation detection and diagnosis circuit and the performance indices circuit by dividing the causes into internal and external groups, selecting a maximum from the internal causes and a maximum from the external causes, and generating an overall loop performance, a loop diagnosis information that provides a cause of the overall loop performance value, an overall controller performance, and a controller diagnosis information that provides a cause of the overall controller performance value; and
    wherein the triggering circuit is configured to trigger an automated tuning mechanism to retune the controller based on a controller performance when the controller performance exceeds a threshold value for particular time interval derived from controlled process time constant estimate.

4. The controller and loop performance monitoring system of claim 3, wherein the system is configured to be updated recursively.

5. The controller and loop performance monitoring system of claim 3, wherein the performance index circuit is configured to focus on the predictability of the controller error, when the controller output is not saturated, by:
    when the controller output is not saturated, forming a model of the controller error and comparing a prediction error variance of the model to a first dummy model and a second dummy model and prediction error variances of the first dummy model and the second dummy model, wherein the first dummy model comprises a naive predictor and the second dummy model comprises a mean as a prediction;
    selecting from the first dummy model and the second dummy model the dummy model with a lower prediction error variance for comparison to the model, thereby forming a ratio of the prediction error variance of the model of controller error to a minimum of naïve predictor error variance and controller error variance; and
    rating the controller as a function of the calculated ratio.

6. The controller and loop performance monitoring system of claim 5, wherein the performance indices circuit is configured to:

update a predictability index when the controller output is greater than a value considered as 0% controller output saturation and lower than a value considered as 100% controller output saturation;

form a disturbance model and update a predictability for the disturbance variable;

compare the predictability of the controller error to the predictability of the disturbance model;

determine that the cause is internal when the predictability of the controller error is higher than the predictability of the disturbance model; and determine that the cause is external when the predictability of the controller error is equal or lower than the predictability of the disturbance model.

7. The controller and loop performance monitoring system of claim 3, wherein the performance indices circuit is configured to focus on controller error offset by:

calculating a variance of a prediction error of the naïve predictor;

calculating a mean squared controller error;

calculating a ratio of the variance of the prediction error of the naive predictor and the mean squared controller error; and rating the controller as a function of the calculated ratio.

8. The controller and loop performance monitoring system of claim 7, wherein the performance index circuit is configured to:

receive a process variable, setpoint, and controller output;

determine if the controller output is higher than a value considered as 0% controller output saturation;

when the controller output is higher, update an offset index;

determine that the cause of the offset index is external when the controller output is equal or higher than a value considered as 100% controller output saturation; and determine that the cause of the offset index is internal when the controller output is lower than a value considered as 100% controller output saturation.

9. The controller and loop performance monitoring system of claim 3, wherein the controller output oscillation monitoring circuit is configured to detect and classify oscillations in controller output by:

detecting a local extreme of controller output using short-term memory of controller output and selecting a minimum or maximum from the short-term memory, when a difference of controller output exceeds a threshold or the specified number of controller output differences have the same sign;

dividing the local extreme of controller output into a minima group and a maxima group and monitoring a distance between local extremes in the minima group and maxima group, wherein the distance relates to a time interval between local extremes and a distance of amplitudes of local extremes; and classifying oscillations based on whether a specified number of local extremes of each group lie within a specified region or the minima and maxima are located near value considered as 0% controller output saturation and value considered as 100% controller output saturation.

10. The controller and the loop performance monitoring system of claim 3, wherein the time trend of the loop performance and/or an actual value of the loop performance are displayed; and wherein the time trend of the loop diagnosis information and/or an actual value of the loop diagnosis information are displayed.

11. The controller and the loop performance monitoring system of claim 3, wherein the time trend of the controller performance and/or an actual value of the controller performance are displayed; and wherein the time trend of the controller diagnosis information and/or an actual value of the controller diagnosis information are displayed.

12. A process to monitor a controller and a loop performance comprising:

passing data from the controller to a diagnose circuit;

monitoring a presence of an oscillation in signals from the controller, diagnosing a cause of the oscillation and determining whether the cause is external to the controller or internal to the controller;

monitoring a loop and providing a diagnosis of one or more causes of poor loop performance and whether such causes are internal to the controller or external to the controller;

merging output from an oscillation detection and diagnosis circuit and a performance indices circuit by dividing the causes into internal and external groups, selecting a maximum from the internal causes and a maximum from the external causes, and generating an overall loop performance, a loop diagnosis information that provides a cause of the overall loop performance value, an overall controller performance, and a controller diagnosis information that provides a cause of the overall controller performance value;

triggering an automated tuning mechanism to retune the controller based on a controller performance when the cause is determined to be internal to the controller and the controller performance exceeds a threshold value for particular time interval derived from controlled process time constant estimate; and triggering an alarm responsive to a determination that the cause is external to the controller.

13. The process to monitor a controller and a loop performance of claim 12, wherein the data passed from the controller to the diagnose circuit comprise a setpoint, a process variable, a controller output, and a disturbance variable measurement.

14. The process to monitor a controller and a loop performance of claim 12, comprising updating the process recursively.

15. The process to monitor a controller and a loop performance of claim 12, comprising focusing on a predictability of a controller error, when a controller output is not saturated, by:

when the controller output is not saturated, forming a model of the controller error and comparing a prediction error variance of the model to a first dummy model and a second dummy model and prediction error variances of the first dummy model and the second dummy model, wherein the first dummy model comprises a naïve predictor and the second dummy model comprises a mean as a prediction;

selecting from the first dummy model and the second dummy model the dummy model with a lower prediction error variance for comparison to the model, thereby forming a ratio of the prediction error variance of the model of controller error to a minimum of naïve predictor error variance and controller error variance; and rating the controller as a function of the calculated ratio.

16. The process to monitor a controller and a loop performance of claim 12, comprising:

updating a predictability index when the controller output is greater than a value considered as 0% controller output saturation and lower than a value considered as 100% controller output saturation;

forming a disturbance model and update a predictability of the disturbance variable;

comparing the predictability of the controller error to the predictability of the disturbance model;

determining that the cause is internal when the predictability of the controller error is higher than the predictability of the disturbance model; and determining that the cause is external when the predictability of the controller error is equal or lower than the predictability of the disturbance model.

17. The process to monitor a controller and a loop performance of claim 12, comprising focusing on controller error offset by:

calculating a variance of a prediction error of the naïve predictor;

calculating a mean squared controller error;

calculating a ratio of the variance of the prediction error of the naïve predictor and the mean squared controller error; and rating the controller as a function of the calculated ratio.

18. The process to monitor a controller and a loop performance of claim 12, comprising:

receiving a process variable, setpoint, and controller output;

determining if the controller output is higher than a value considered as 0% controller output saturation;

when the controller output is higher, updating an offset index;

determining that the cause of the offset index is external when the controller output is equal to or higher than a value considered as 100% controller output saturation; and determining that the cause of the offset index is internal when the controller output is lower than a value considered as 100% controller output saturation.

19. The process to monitor a controller and a loop performance of claim 12, comprising detecting and classifying oscillations in controller output by:

detecting a local extreme of controller output using short-term memory of controller output and selecting a minimum or maximum from the short-term memory, when a difference of controller output exceeds a threshold or the specified number of controller output differences have the same sign;

dividing the local extreme of controller output into a minima group and a maxima group and monitoring a distance between local extremes in the minima group and maxima group, wherein the distance relates to a time interval between local extremes and a distance of amplitudes of local extremes; and classifying oscillations based on whether a specified number of local extremes of each group lie within a specified region or the minima and maxima are located near value considered as 0% controller output saturation and value considered as 100% controller output saturation.

20. A non-transitory machine-readable medium comprising instructions that when executed by a processor execute a process comprising:

receiving data from a controller;

monitoring a presence of an oscillation in signals from the controller, diagnosing a cause of the oscillation and determining whether the cause is external to the controller or internal to the controller;

monitoring a loop and providing a diagnosis of one or more causes of poor loop performance and whether such causes are internal to the controller or external to the controller;

dividing the causes into internal and external groups, selecting a maximum from the internal causes and a maximum from the external causes, and generating an overall loop performance, a loop diagnosis information that provides a cause of the overall loop performance value, an overall controller performance, and a controller diagnosis information that provides a cause of the overall controller performance value;

triggering an automated tuning mechanism to retune the controller based on a controller performance when the cause is determined to be internal to the controller and the controller performance exceeds a threshold value for particular time interval; and triggering an alarm responsive to a determination that the cause is external to the controller.

* * * * *